United States Patent [19]

Heim et al.

[11] Patent Number: 5,220,229
[45] Date of Patent: Jun. 15, 1993

[54] ELECTRICAL MACHINE IN WHICH CLAMPING PARTS ARE INSERTED BETWEEN POLE BODIES AND WINDING COILS

[75] Inventors: Bruno Heim, Grosseibstadt; Eugen Hahn, Bad Neustadt, both of Fed. Rep. of Germany

[73] Assignee: Siemens Aktiengesellschaft, Berlin and Munich, Fed. Rep. of Germany

[21] Appl. No.: 824,598

[22] Filed: Jan. 23, 1992

[30] Foreign Application Priority Data

Apr. 8, 1991 [DE] Fed. Rep. of Germany ....... 4111320

[51] Int. Cl.[5] .................. H02K 15/04; H02K 3/46
[52] U.S. Cl. ....................... 310/260; 310/42; 310/214
[58] Field of Search ............... 310/218, 214, 194, 42, 310/91, 179, 258, 260

[56] References Cited

U.S. PATENT DOCUMENTS

| | | | |
|---|---|---|---|
| 886,561 | 5/1908 | Waters | 310/260 |
| 2,709,763 | 5/1955 | Opel | 310/194 |
| 4,255,683 | 3/1981 | Krisch et al. | 310/214 |
| 4,629,918 | 12/1986 | Amendolz et al. | 310/65 |
| 4,633,114 | 12/1986 | Reynolds | 310/194 |
| 4,734,603 | 3/1988 | Vonder Heide et al. | 310/72 |
| 4,818,911 | 4/1989 | Taguchi et al. | 310/259 |
| 4,847,527 | 6/1989 | Dohogne | 310/218 |

FOREIGN PATENT DOCUMENTS

| | | |
|---|---|---|
| 0064105 | 11/1982 | European Pat. Off. . |
| 0155539 | 12/1903 | Fed. Rep. of Germany . |
| 3244844 | 6/1984 | Fed. Rep. of Germany . |
| 3607552 | 9/1986 | Fed. Rep. of Germany . |
| 0096123 | 3/1973 | German Democratic Rep. . |
| 0616281 | 3/1980 | Switzerland . |
| 0843104 | 6/1981 | U.S.S.R. . |
| 1030918 | 7/1983 | U.S.S.R. . |
| 1160627 | 8/1969 | United Kingdom . |

Primary Examiner—Steven L. Stephan
Assistant Examiner—D. R. Haszko
Attorney, Agent, or Firm—Kenyon & Kenyon

[57] ABSTRACT

An electrical machine contains winding coils, in which the winding coils are able to be slid from the stator bore on to pole bodies provided on the stator of the machine and are retained on the pole bodies. The power/space ratio of the winding space available on the pole bodies is able to be increased by inserting at least one clamping part on the end faces of the pole bodies between the specific end face and the mounted winding coil. This clamping part is provided with at least two retention arms which extend in mutual opposition in the circumferential direction of the machine. The clamping part extends with the retention arms under the winding coil on the coil side facing the exposed end of the pole bodies.

10 Claims, 4 Drawing Sheets

ELECTRICAL MACHINE IN WHICH CLAMPING PARTS ARE INSERTED BETWEEN POLE BODIES AND WINDING COILS

BACKGROUND OF THE INVENTION

The present invention relates to an electrical machine containing winding coils. More specifically, the winding coils can be slid from a stator bore on to pole bodies provided in the stator of the machine and are retained on the pole bodies by means of clamping parts that are retained by latching means on the pole body.

The German published patent document, DD-A-96 123, discloses an electrical machine with such winding coils and clamping parts. In this machine, the clamping parts are formed as elbow units, whose two limbs stand nearly at right angles to each other and are curved upon themselves. The elbow units are inserted with one limb between the pole body and the winding coil that has been slid on to this pole body, and they extend with the other limb under the winding coil on the side facing the exposed portion of the pole body. The elbow units are latched with their angle apex behind a projection formed on the pole body.

With this type of mounting support a problem arises in that a considerable section of the length of the pole body cannot be used to accommodate the winding coils, i.e., the potential winding space is not completely available. To achieve a stable mounting support for the winding coils on the pole bodies, a larger number of clamping parts is necessary.

SUMMARY OF THE INVENTION

The present invention seeks to provide a solution to this problem by further developing an electrical machine of this type so that the winding space available on the pole bodies can be used as optimally as possible in the radial direction.

The solution to the stipulated task is achieved by providing clamping parts that are inserted on the end faces of the pole bodies between a specific end face and the mounted winding coil and have at least two retention arms which extend in mutual opposition in the circumferential direction of the machine. Furthermore, the clamping parts are latched on to the pole body within the area covered by the winding coil.

The arrangement of the clamping parts on the end faces of the pole bodies makes it feasible to provide two mutually opposing retention arms, which extend in the circumferential direction of the machine, on the clamping parts.

Thus, with the two clamping parts arranged on the end faces of the pole bodies, four points of support are provided for the winding coil, so that this coil is stably retained on the pole body. By latching the clamping parts within the area covered by the winding coil, a greater length of the pole body is available to accommodate the winding coil. Moreover, the retention arms themselves can also be designed to enable the winding coils to extend as much as possible over the full radial length of the pole bodies.

A particularly good clamping effect can be achieved because the contour of the side of the clamping part turned toward the winding coil is adapted to the profile of the winding coil. To compensate for unavoidable dimensional tolerances, it is advantageous for the wall part of the clamping part that abuts on the winding coil to have a flexible construction. The requisite flexibility is able to be achieved by providing the clamping part with a hollow form and the wall part abutting on the winding coil with a slit, in particular with a separating slit which passes through in the axial direction of the clamping part. As a result, the wall part is subdivided into two wall arms, which demonstrate a suitable mobility because of the elasticity of the material.

It is possible to latch the clamping part on the pole body in a structurally simple way by providing at least one bore hole on the end face of the pole body within the area of the pole body covered by the winding coil and by flexibly configuring at least one knob, which is capable of latching with the bore hole, on the wall side of the clamping part adjacent to the pole body.

Since the clamping part abuts closely on the windings of the coil, sensors can be mounted on the clamping part, particularly for detecting the winding temperature. The connecting leads of such sensors can thereby be run unhindered through the free space existing between the wall arms of the clamping part to the outside.

Control lines or measuring lines must be run at least from one end face of the machine to the other end face. To fix them in position, mounting supports are provided at least on one longitudinal side of the winding coil.

In machines in which the winding coils are mounted on commutating pole bodies situated between main poles, separator pieces or spacers are effectively used as mounting supports between the winding coils of the commutating poles and the winding coils that had been placed on the main poles. These spacers are provided in this case with a lug or extension which has a receiving slot and which extends under the longitudinal side of the coil.

To avoid obstructing the flow of cool air, the spacers are provided with perforations that extend in the longitudinal direction of the machine.

BRIEF DESCRIPTION OF THE DRAWINGS

The subject matter of the present application shall be described in greater detail with references to the drawing figures.

DETAILED DESCRIPTION

Figure 1:
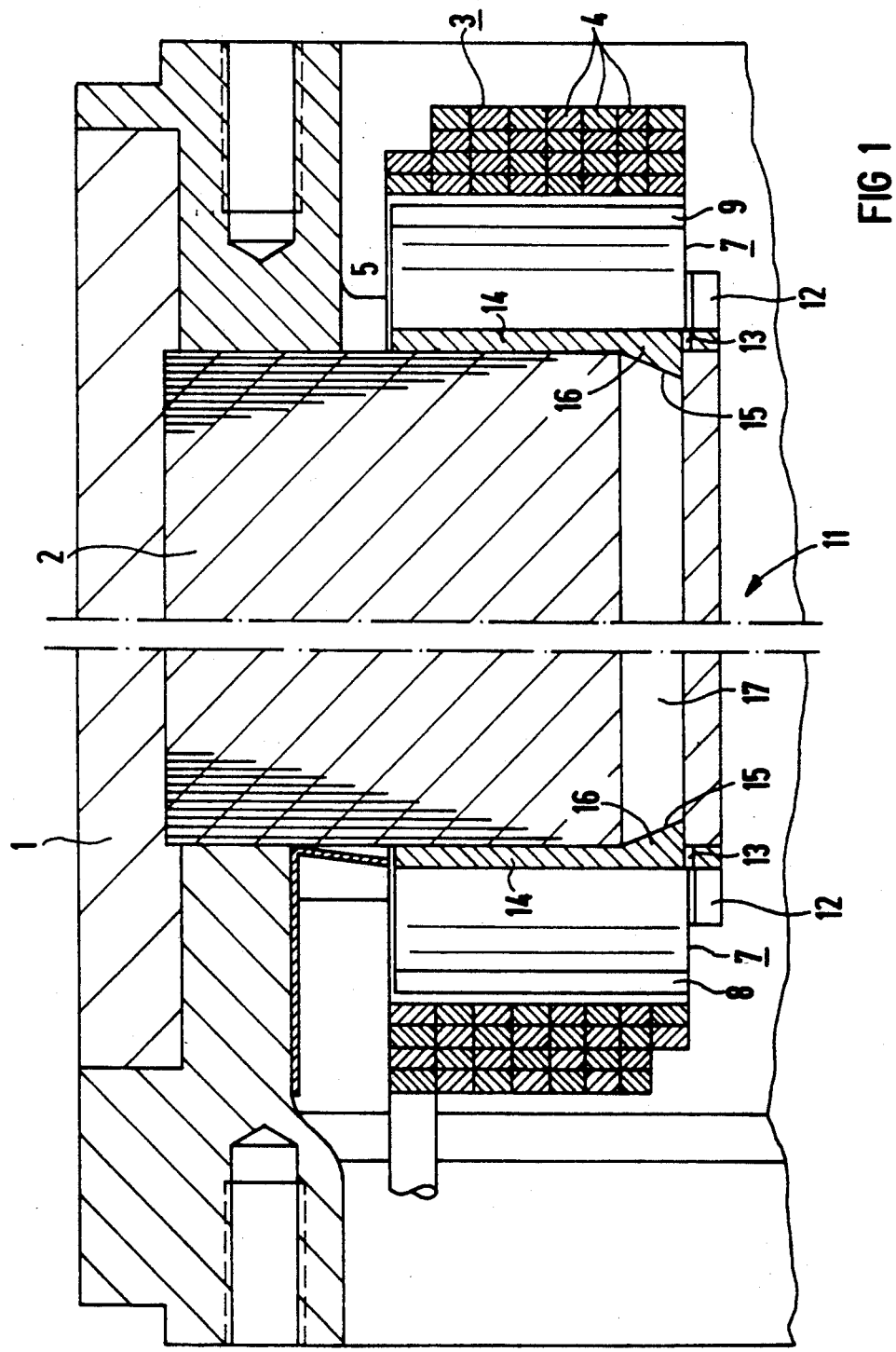
FIG. 1 illustrates a pole body of an electrical machine equipped with a winding coil, in cross-section in accordance with an embodiment of the present invention.
Figure 2:
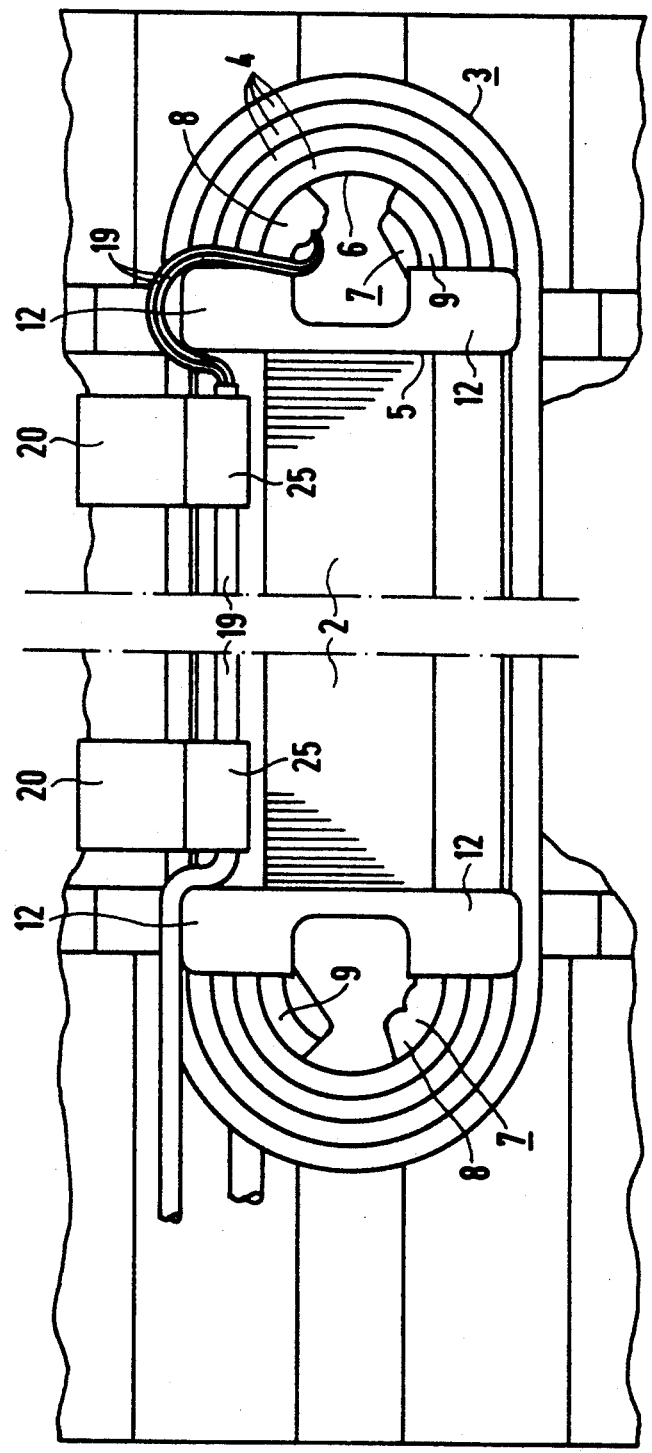
FIG. 2 illustrates a top view of a pole body of the electrical machine equipped with a winding coil of FIG. 1, from the viewpoint of the stator bore.
Figure 4:
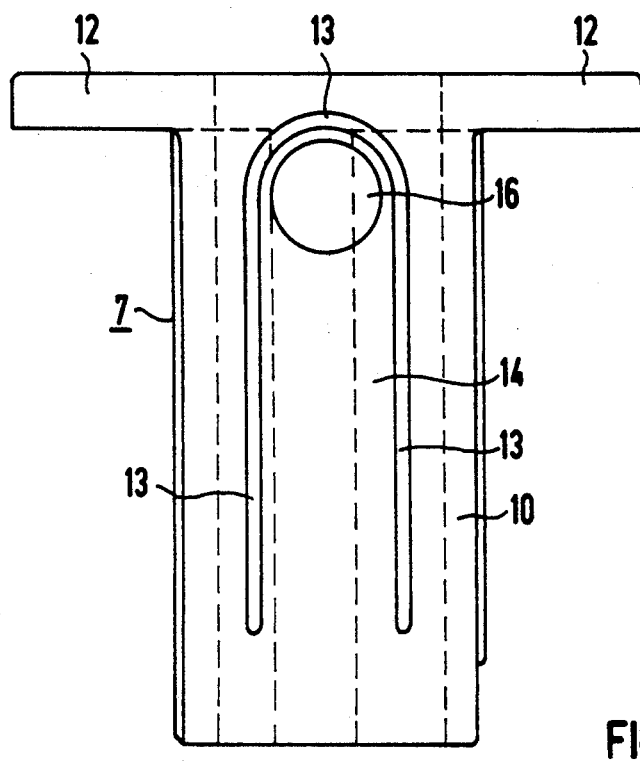
FIG. 4 illustrates a view of the side of a clamping part of FIG. 3 abutting on an end face of the pole body.

In FIG. 1, 1 denotes the stator, without a housing, of an electrical machine with integrated pole bodies 2. A prefabricated winding coil 3 is mounted on this pole body 2. As can be recognized from the top view of FIG. 2, the windings 4 of the winding coil 3 on the end faces 5 of the pole body 2 have a circular design. As a result, a hollow space is formed between the flat end face 5 of the pole body 2 and the circular arc 6 of the innermost winding 4. A clamping part 7, which secures the winding coil 3 on the pole body 2 and advantageously consists of plastic, is inserted in the hollow space.

This clamping part 7 features two wall arms 8 and 9, whose outer contour is adapted to the circular profile of the innermost winding 4. These wall arms 8 and 9 are premolded on to a flat wall 10 of the clamping part 7 which abuts on the end face 5 of the specific pole body 2. On the side turned toward the stator bore 11, the clamping part 7 also has two retention arms 12, which extend in mutual opposition in the circumferential direction of the machine and under the winding coil 3 on the side turned toward the stator bore.

A flexible arm 14 is formed on the flat wall 10 of the clamping part 7 by means of notches 13. A knob 16, provided with a leading slant 15, is premolded on to the arm 14. By means of this knob 16, the clamping part 7 engages with a bore hole 17 provided in the pole body 2 and is secured in this manner.

Figure 3:
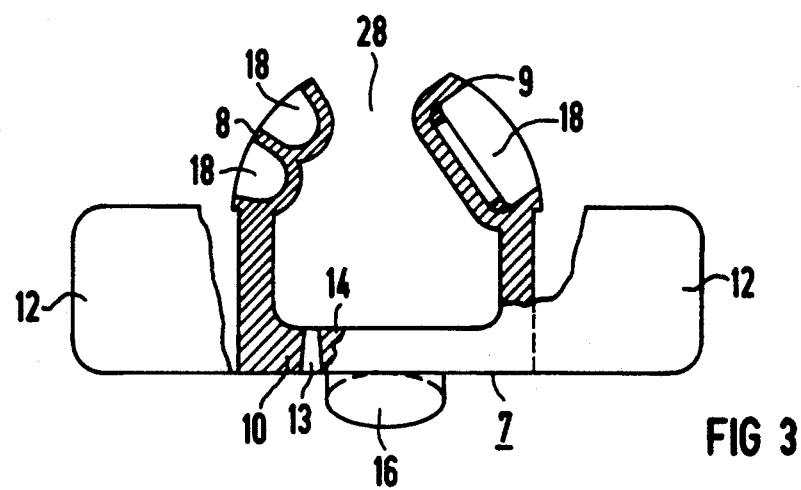
FIG. 3 illustrates a partially opened-up top view of a clamping part for use in the electrical machine of FIG. 1.

As can be recognized from FIG. 3, receiving recesses 18 are shaped on the wall arms 8 and 9. Sensors, for example temperature detectors, can be installed in these receiving recesses. These sensors make contact with the winding coil 3 and are, therefore, very capable of detecting the temperature of the coil. The sensors are connected via connecting leads 19 to an evaluation location arranged centrally at the machine or also outside of the same. The connecting leads 19 are run from the point of insertion of the sensor or sensors on the wall arm 8 or 9 through the free space between the wall arms 8 and 9 toward the stator bore. If the connecting leads 19 must also still be run from the one machine side to the other machine side, then they can be retained by means of appropriate mounting supports 20 below the longitudinal side of the specific winding coil 3.

Figure 5:
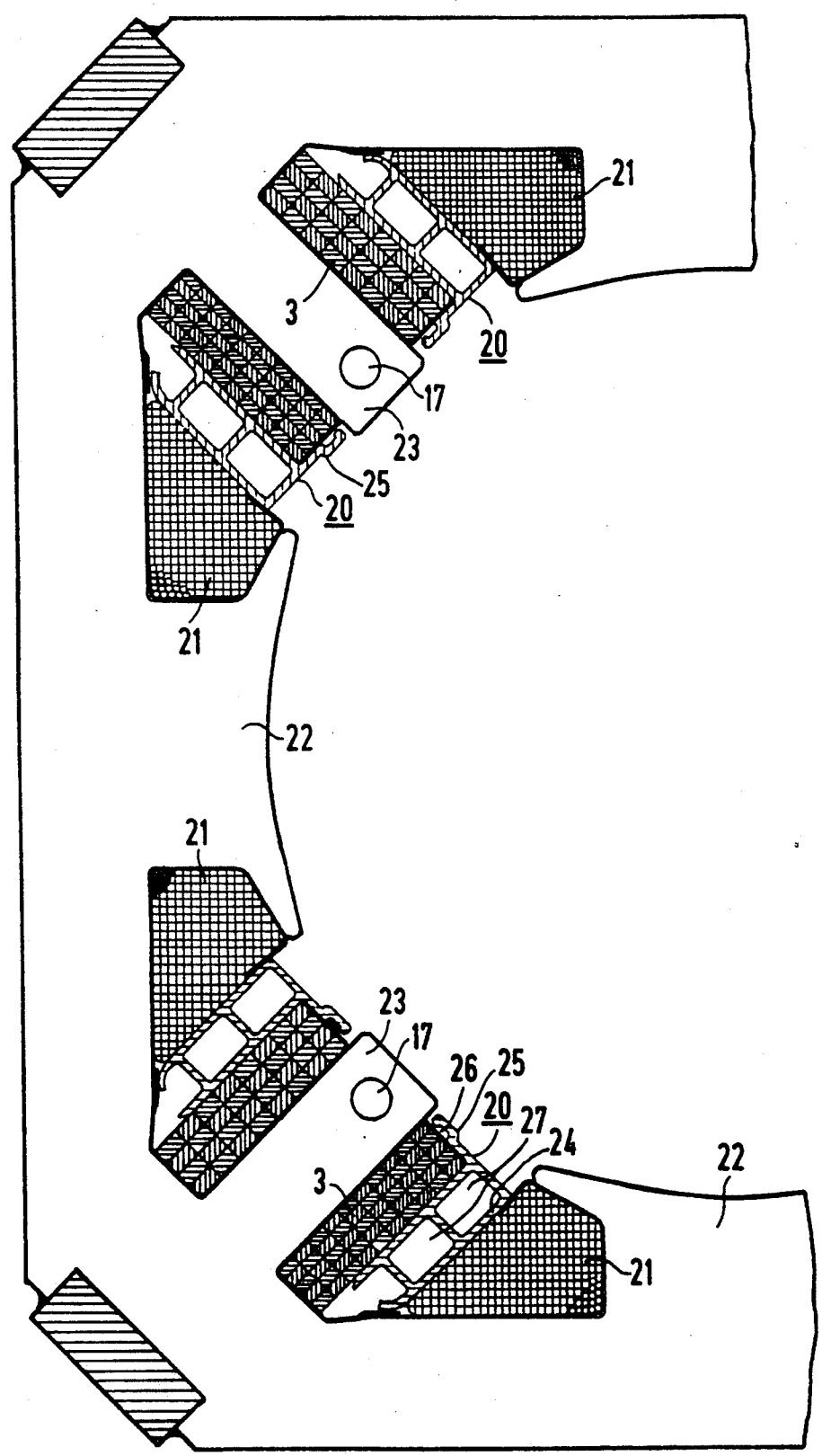
FIG. 5 illustrates an electrical machine according to a further embodiment of the invention, showing a main and commutating pole in cross-section.

As FIG. 5 shows, one can use lugs 25 as mounting supports 20 for the connecting leads 19. These lugs 25 are premolded as separator pieces 24, which are inserted between the winding coils 21 of the main poles 22 and the winding coils 3 of the commutating poles 23 of the machine. In each case, one receiving slot 26 is provided on the side of the lugs 25 that abuts on the longitudinal side of the winding coil 3, and the connecting leads 19 are inserted into this receiving slot 26.

Furthermore, the separator pieces 24 are provided with perforations 27, which extend in the longitudinal direction of the machine, to allow cool air to pass through as unobstructed as possible.

During the assembly of the machine stator, the winding coils 3 are slid on to the pole body 2 of the commutating pole 23. The clamping parts 7 are then pushed in from the side of the stator bore into the hollow space existing between the end faces 5 of the pole bodies 2 and the circular arc 6 of the innermost winding 4. The wall arms 8 and 9 can adapt themselves suitably due to the separating slit 28 existing between them and the elasticity of their material, even when the individual circular arcs 6 show discrepant dimensions, so that these wall arms 8 and 9 contact well on the curve of the windings 4. The clamping part 7 slides with the flat wall 10 along the end face 5 of the pole body 2. With its leading slant 15, the knob 16 meets the edge of the pole body and slides across it, since the knob is able to give way due to the flexible property of the arm 14. The clamping part 7 is pushed so far into the hollow space until the knob 16 is situated congruently in front of the bore hole 17. As a result of the spring action of the arm 14, the knob 16 is pressed into the bore hole 17 and abuts with its round outer contour against the bore hole 17. The clamping part 7 is consequently securely latched to the pole body 2 and, by means of its retention arms 12 extending under the winding coil 3, it is able to securely retain the winding coil on the pole body.

What is claimed is:

1. In an electrical machine containing winding coils, in which the winding coils are slid from a stator bore onto pole bodies provided on the stator of the machine, a system for mounting winding coils on a pole body comprising:

a clamping part, which is inserted between a specific pole body and a winding coil mounted on this pole body; and means for latching said clamping part on the pole body, wherein said clamping part is inserted on an end face of the pole body between a specific end face and the mounted winding coil and has at least two retention arms, which extend in mutual opposition in a circumferential direction of the machine and which extend under the winding coil on the coil side facing an exposed end of the pole body, and wherein the clamping part is latched on to the pole body within the area covered by the winding coil.

2. The system according to claim 1, wherein a contour of a side of the clamping part turned toward the winding coil is adapted to a curved profile of the winding coil around the end faces of the pole body.

3. The system according to claim 1, wherein a wall part of the clamping part that abuts on the winding coil has a flexible construction.

4. The system according to claim 1, further comprising at least one bore hole provided on the end face of the pole body within the area of the pole body covered by the winding coil; and at least one knob, which is capable of latching with the bore hole flexibly configured on a wall side of the clamping part adjacent to the pole body.

5. The system according to claim 2 wherein at least one sensor is arranged in the contour side of the clamping part abutting on the winding coil.

6. The system according to claim 5, further comprising connecting leads connecting said at least one sensor to evaluation circuitry, wherein said connecting leads run out of the clamping part through a free space formed on said clamping part toward a side of the clamping part turned toward the exposed end of the pole body.

7. The system according to claim 6, further comprising mounting supports for the connecting leads of the sensors, said mounting supports configured on at least one longitudinal side of the winding coil.

8. The system according to claim 7, in which the winding coils are slipped on to the pole body of commutating poles situated between the main poles of the machine, wherein said mounting supports include separator pieces that are inserted between the winding coils on the commutating pole and the winding coils placed on a main pole and further include a lug, which has a receiving slot and which extends under the longitudinal side of the coil.

9. The system according to claim 8, wherein said separator pieces are provided with perforations that extend in the longitudinal direction of the machine.

10. The system according to claim 5, wherein said at least one sensor comprises at least one temperature detector detecting a temperature of the winding coil.

* * * * *